(12) United States Patent
Jespersen et al.

(10) Patent No.: US 11,479,001 B2
(45) Date of Patent: Oct. 25, 2022

(54) DEVICE AND A METHOD OF ALIGNING CORE ELEMENTS USING SUCH DEVICE

(71) Applicant: LM WIND POWER INTERNATIONAL TECHNOLOGY II APS, Kolding (DK)

(72) Inventors: Klavs Jespersen, Kolding (DK); Lars Nielsen, Kolding (DK)

(73) Assignee: LM WINDPOWER INTERNATIONAL TECHNOLOGY II APS, Kolding (DK)

( * ) Notice: Subject to any disclaimer, the term of this patent is extended or adjusted under 35 U.S.C. 154(b) by 298 days.

(21) Appl. No.: 16/615,660

(22) PCT Filed: May 22, 2018

(86) PCT No.: PCT/EP2018/063358
§ 371 (c)(1),
(2) Date: Nov. 21, 2019

(87) PCT Pub. No.: WO2018/215448
PCT Pub. Date: Nov. 29, 2018

(65) Prior Publication Data
US 2020/0215771 A1 Jul. 9, 2020

(30) Foreign Application Priority Data
May 22, 2017 (EP) ..................................... 17172209

(51) Int. Cl.
*F03D 1/06* (2006.01)
*B29C 70/54* (2006.01)
(Continued)

(52) U.S. Cl.
CPC .......... *B29C 70/541* (2013.01); *F03D 1/0675* (2013.01); *B29D 99/0025* (2013.01); *B29L 2031/085* (2013.01)

(58) Field of Classification Search
CPC .... F03D 1/0633; F03D 1/0675; F03D 1/0683; F03D 1/0641; F05B 2240/302;
(Continued)

(56) References Cited

U.S. PATENT DOCUMENTS 2,290,855 A 7/1942 Myer
9,022,745 B2 * 5/2015 Shimono ................. F03D 80/30
416/244 R
(Continued)

FOREIGN PATENT DOCUMENTS

DE 761914 C 10/1952
DE 3619287 A1 12/1987
(Continued)

*Primary Examiner* — Courtney D Heinle
*Assistant Examiner* — Sang K Kim
(74) *Attorney, Agent, or Firm* — Nath, Goldberg & Meyer; Jerald L. Meyer; Tanya E. Harkins

(57) ABSTRACT

This invention relates to a kit for manufacturing a wind turbine blade component, a method of manufacturing such a wind turbine blade component and a wind turbine blade component thereof. The individual panel sections are interlocked via interlocking devices arranged between adjacent panel sections. The interlocking device comprises first engaging element for engaging the adjacent panel sections, wherein the interlocking device is forced into the panel section by applying force to the interlocking device.

15 Claims, 6 Drawing Sheets

(51) Int. Cl.
*B29D 99/00* (2010.01)
*B29L 31/08* (2006.01)

(58) Field of Classification Search
CPC .............. B29C 70/541; B29D 99/0025; B29L
2031/085; F15B 15/00; B64C 3/26
See application file for complete search history.

(56) References Cited

U.S. PATENT DOCUMENTS

2008/0250744 A1  10/2008 Hrovath et al.
2015/0132137 A1* 5/2015 Humblot ............... F03D 1/0683
 416/212 R

FOREIGN PATENT DOCUMENTS

| | | |
|---|---|---|
| DE | 102008044803 A1 | 3/2010 |
| EP | 0886016 A1 | 12/1998 |
| GB | 1580841 | 12/1980 |
| GB | 2530072 A | 3/2016 |

\* cited by examiner

DEVICE AND A METHOD OF ALIGNING CORE ELEMENTS USING SUCH DEVICE

This is a National Phase Application filed under 35 U.S.C. 371 as a national stage of PCT/EP2018/063358, filed May 22, 2018, an application claiming the benefit of European Application No. 17172209.3, filed May 22, 2017, the content of each of which is hereby incorporated by reference in its entirety.

TECHNICAL FIELD

The present invention relates to an interlocking device for locking panel sections of a core material, wherein the interlocking device is brought into engagement with adjacent panel section.

The present invention also relates to a kit for manufacturing a wind turbine blade component, comprises a first and a second panel section and such an interlocking device for locking the first and second panel sections.

The present invention further relates to a method of manufacturing a wind turbine blade, comprising the steps of laying up of layers of a fibre material, then arranging a kit of panel sections as described above, and finally laying up further layers of the fibre material, wherein a resin is afterwards introduced into the fibre material and the core material and then cured.

The present invention finally relates to a wind turbine blade manufactured with a kit of panel sections and an interlocking device as described above.

BACKGROUND

It is well-known that wind turbine blades for modern wind turbines have become larger and heavier in an effort to increase the energy production from the wind turbine. This is achieved by increasing the aerodynamic profile of the wind turbine blades and thus increasing the blade length. Increasing the size of the wind turbine blade also increases the aerodynamic and static loadings on the wind turbine blade.

The wind turbine blade may be manufactured by laying up layers of a laminate of a fibre material in a blade mould, optionally after a gel coating have been applied to the moulding surface. A panel of a core material may be arranged between a first set of layers of fibre material and a second set of layers of fibre material to form a sandwich structure. A resin is then introduced into the fibre material and the core material, and finally cured to form a first blade shell part with a desired aerodynamic profile. The process is then repeated for a second blade shell part. The two cured blade shell parts are joined together via an adhesive. The outer surfaces or only the exposed glue lines of the blade shell may be worked into their finished shape and then coated to form the finished wind turbine blade.

The core panel comprises a plurality of individual panel sections which are aligned relative to each other. Each panel section comprises a plurality of individual core blocks attached to a flexible fabric or sheet, such as disclosed in U.S. Pat. No. 8,470,425 B2. A known problem is misalignment of the panel sections resulting in large gaps forming between the panel sections or wrinkles forming in the sandwich structure. This may lead to incorrect placement of the main laminate which, in turn, affects the overall performance and structural properties of the wind turbine blade. One way of locking the panel sections is to attach staples or splines made of metal or plastic.

DE 102009054690 A1 discloses another way of locking the individual panel sections using interlocking devices. Each panel section comprises a single recess arranged in the peripheral edge or end surface for receiving one end of the interlocking device. The interlocking device is inserted into a pair of aligned recesses. The ends of the interlocking device are shaped as dovetails and the recesses form a tight fit around the dovetail ends. The opposite side surfaces of the locking device project beyond the corresponding side surfaces of the adjacent panel sections, thereby enabling the locking device to block any transverse resin flow and guide the resin flow along the length of the locking elements.

GB 2530072 A discloses a kit of panel sections sandwiched between layers of a fibre material. The sandwich structures are distributed along a base layer of fibre material in the chordwise direction, wherein the sandwich structures and the base layer are stitched together. The kit is then lifted into position on the moulding surface and interlocked with an adjacent kit. The kits are interlocked by engaging fame and female elements formed in the individual panel sections. This manufacturing process requires each panel section to be pre-fabricated with said engaging fame and female elements, thereby increasing costs of such panel sections.

GB 1580841 A discloses a disk shaped interlocking device for joining timber elements, wherein a number of teeth project from one side surface. A pair of finger shaped elements projects further from the base plate, wherein each finger has a pre-bend free end. The fingers are designed to prevent rotation and prevent the interlocking device from moving out of engagement. The teeth and fingers extend all partly into the timber element. The base plate further has a central collar for engaging a bolt, which projects in the same direction as the teeth and fingers. Such a device is made of metal for sufficient strength which makes them unsuited for use in a wind turbine blade as they would attract lightning strikes.

DE 761914 C discloses also discloses a disk shaped interlocking device for joining timber elements, wherein the device comprises a ring of outer teeth and a ring of inner teeth projecting from a base plate. The inner teeth extend beyond the outer teeth for added engagement, hence, both sets of teeth project partly into the timber elements. A central collar projects from the base plate in the opposite direction relative to the outer and inner teeth, wherein a bolt can be inserted into the central collar. Further, the outer teeth are made of a different metal alloy than the inner disk part with inner teeth, wherein the two disk parts are welded together. Thereby, making it unsuited for use in a wind turbine blade as they would attract lightning strikes. Further, the collar would cause wrinkles to form in the fibre layers, which is not desired.

OBJECT OF THE INVENTION

An object of the invention is to provide a kit, a method and a wind turbine blade that solves the abovementioned problems.

Another object of the invention is to provide a kit, a method and a wind turbine blade that allows for a simple and easy alignment of the individual panel sections.

Yet another object of the invention is to provide a kit, a method and a wind turbine blade that reduces the risk of resin accumulating in large gaps between the panel sections.

DETAILED DESCRIPTION OF THE INVENTION

One object of the invention is achieved by an interlocking device for locking panel sections of a core material of a wind turbine blade, the interlocking device has a first end, an opposite second end and at least one outer side surface arranged between the first and second ends, the interlocking device comprises a base portion having a body with a predetermined outer height and outer width, the body is configured to provide support for at least a number of first engaging elements projecting from a first proximal end of the body to the second end, the first engaging elements being configured to be brought into engagement with a first panel section and a second panel section by applying a force to said first end, characterised in that the interlocking device comprises at least one engaging element configured to extend beyond one side surface of said panel sections, when placed in a final position of engagement, wherein said at least one engaging element is configured to engage at least one layer of a fibre material arranged on said one side surface of the panel sections.

This provides an improved joint between the individual panel sections during manufacture of a wind turbine blade, wherein the individual panel sections are interlocked in a more stable and reliable manner. The present solution also provided a simple and easy manner of aligning the respective panel sections during lay-up.

Conventional staples or splines have a tendency to move out of engagement, even during minor relative movements of the interlocked panel sections. The panel sections then have to be re-aligned and additional staples or splines have to be inserted. This in turn increases the risk of large uncontrollable gaps forming and misalignment of the main laminates of the load carrying structure. Staples or splines moved partly out of engagement may further result in wrinkles or steps forming in the sandwich structure after curing.

The present interlocking device is brought into engagement with adjacent panel sections to lock these panel sections relative to each other. The interlocking device may be used to lock the adjacent panel sections so that they are substantially abutting each other. Alternatively, the adjacent panel sections may be locked so they form a substantially uniform gap between their opposite facing first or second edge surfaces. This in turn reduces the risk of large gaps forming between the individual panel sections in which the resin is able to accumulate.

Engagement of the present interlocking device is performed by moving it into a final position relative to the panel sections, wherein an end surface of the first end is substantially flushed with a second side surface of the panel sections. Alternatively, the end surface may be retracted relative to the second side surface. This forms a concealed joint between the locked panel sections unlike the interlocking device of DE 102009054690 A1. By providing a substantially flushed continuous side surface, the resin in the adjoining outer and/or inner layers of fibre material is able to flow freely along this continuous side surface. This further reduces the risk of steps or wrinkles forming in the fibre material, unlike the device of DE 761914 C.

Preferably, the interlocking device comprises at least three, e.g. four, five six or more, first engaging elements distributed over the first proximal end. The interlocking device alternatively comprises one sub-set of first engaging elements for engaging the first panel section and another sub-set of first engaging elements for engaging the second panel section. For example, each sub-set may comprise at least two first engaging elements. This allows for a more stable and reliable engagement as the interlocking device is prevented from rotating around the teeth.

The interlocking device further comprises a number of engaging elements configured to engage a number of adjoining layers of fibre material arranged relative to a side surface of the panel section. For example, at least one of said first engaging elements may be configured to engage at least the outer layer(s) of fibre material, as described below. For example, at least one second engaging element may be configured to engage the inner layer(s) of fibre material, as described below. This cannot be achieved by the devices of DE 761914 C and GB 1580841 A.

According to one embodiment, said interlocking device comprises a first set of first engaging elements having a first local height and at least a second set of first engaging elements having a second local height, wherein said first local height is equal to or greater than the second local height.

The first engaging elements of the present interlocking device may each have the same height and/or profile for a uniform engagement with the respective panel sections. This allows the interlocking device to be installed regardless of its orientation.

Alternatively, the interlocking device may comprise a first set of first engaging elements with a first local height and/or a first profile; a second set of first engaging elements with a second local height and/or a second profile; and so on. Each set may comprise one, two, three, four or more first engaging elements. For example, the first local height may be greater than the second local height, or vice versa. For example, the first profile may differ from the second profile, or be the same.

The first engaging elements, the base portion and, optionally the second engaging elements described later, define a total height of the interlocking device. The base portion, or alternative the first or second engaging elements, define a total width of the interlocking device.

The tip or second end of the first engaging elements may all be arranged between the opposite facing side surfaces of the respective panel sections, when placed in the final position. Thereby, enabling the first engaging elements to remain concealed within the core element. This allows the individual panel sections to be secured relative to each other.

Alternatively, the tip or second end of the first engaging elements may all project beyond the first side surface of the respective panel section, when placed in the final position. Thereby, enabling the first engaging elements to, at least partly, further engage one or more of the adjoining outer layers of fibre material. This allows the interlocking device to be used to further secure the individual panel sections relative to the adjoining layers of fibre material, thereby preventing the kit of panel sections from sliding out of position during the lay-up. This also reduces the risk of pieces of the core material breaking off.

The first set of first engaging elements may extend further into the inner layers of fibre material than the second set of first engaging elements. Alternatively, the first and second sets of first engaging elements may extend equally into the inner layers of fibre material. Thereby, allowing for an increased engagement with the adjoining layers of fibre material.

Alternatively, the tip or second end of the first set of first engaging elements may be arranged between the opposite facing side surfaces of the respective panel section, when placed in the final position. The tip or second end of the second set of first engaging elements may project beyond the first side surface of the respective panel section, when placed in the final position. Thereby, enabling some of the first engaging elements to remain concealed within the core element while others of the first engaging elements extend beyond the core element. The panel sections can thus be interlocked and secured relative to the outer layers of fibre material.

According to one embodiment, the interlocking device further comprises a number of second engaging elements projecting from a second proximal end of the body to the first end.

The present interlocking device may further comprise a number of second engaging elements arranged on the opposite side of the body. The first engaging elements may project from the first proximal end to the second end while the second engaging elements may project from a second proximal end to the first end. The first and second engaging elements may have the same profile or different profiles. The first and second engaging elements may further have the same height or different heights. For example, the interlocking device may comprise at least three, e.g. four, five six or more, second engaging elements distributed over the second proximal end. This allows the interlocking device to further secure the inner layers of fibre material relative to the panel sections during lay-up.

A first set and a second set of second engaging elements may be distributed along the second proximal end. The first set of second engaging elements may have a third height and/or a third profile and the second set of second engaging elements may have a fourth height and/or a fourth profile. For example, the third height may be greater than the fourth height, or vice versa. This allows for an increased engagement with the adjoining layers of fibre material.

For example, the tip or first end of the second engaging elements may project beyond the second side surface of the respective panel section, when placed in the final position. Thereby, enabling the second engaging elements to, at least partly, engage one or more of the adjoining layers of fibre material. The second proximal end may be flushed with or retracted relative to the second side surface. This allows the interlocking device to be used to secure the adjoining layers of fibre material, which are laid up over the individual panel sections. This prevents the inner layers from sliding out of position relative to the kit of panel sections during the lay-up.

The second engaging elements may be arranged continuously along the second proximal end. Alternatively, a continuous edge surface may be arranged between groups of second engaging elements or between individual second engaging elements. This continuous edge surface may act as a contact surface for applying force to the interlocking device. Alternatively, the first end may comprise a head-like piece defining the contact surface to which force may be applied.

According to one embodiment, at least one of said first engaging elements and said second engaging elements are teeth each with a predetermined profile.

The first engaging elements may be shaped as teeth, e.g. first teeth, having a profile suitable for engagement with a core element of the panel section and, optionally, with the adjoining layers of fibre material. Alternatively or additionally, the second engaging elements may be shaped as teeth, e.g. second teeth, having a profile suitable for engagement with the adjoining layers of fibre material.

For example, the first teeth and/or the second teeth may have an overall triangular profile, a semi-circular profile, an elliptical profile, a curved profile or another suitable profile. Each first and/or second tooth may have a peripheral edge extending along its profile. The peripheral edge may be shaped as a blunt edge or a cutting edge for facilitating engagement with the core element of the respective panel section and/or with the adjoining layers of fibre material.

Engagement may be achieved by forcing the interlocking device, e.g. the first teeth, into the core element of the respective panel section. The panel section may thus have a continuous side surface and/or edge surface, as no cavities in the edge surfaces are needed for inserting the interlocking device as in DE 102009054690 A1. Furthermore, no additional machining or milling of the panel sections is required, thus the present interlocking device may be used to interlock existing kits of panel sections as well as new kits of panel sections. This also allows the interlocking device to be freely positioned along the peripheral edge of two adjacent panel sections.

The interlocking device may be moved into partly engagement with the respective panel section prior to moving it into the final position. This may be achieved by forcing the interlocking device into a temporary position relative to the panel section, wherein an end surface of the first end is arranged between the first and second side surfaces of the panel section. This allows the interlocking device to be removed if re-alignment of the individual panel sections is needed. After re-alignment of the panel sections, the interlocking device may simply be moved into a new temporary positon or directly into the final position.

According to one embodiment, said body is a solid or tubular body with at least an outer side surface arranged between said first proximal end and said first end or second proximal end.

The present interlocking device may have a tubular or solid body defining the base portion, wherein the body is configured to provide support for the first engaging elements and, optionally, the second engaging elements. The body and the projecting engaging elements may have a structure that enables the interlocking device to be forced into engagement without breaking or significantly deforming when applying force. This allows the interlocking device to be installed by hand or via an installation tool.

Here, the 'tubular body' is defined as a structure with a number of outer walls enclosing one or more inner cavities or recesses, wherein the outer walls define an outer profile of the interlocking device. Here, the 'solid body' is defined as a continuous structure defining the outer profile of the interlocking device.

The body may have at least outer side surface and, optionally, at least one inner surface arranged between the opposite facing proximal ends. The first end may define the second proximal end if no second engaging elements are provided. The outer height of the body may be measured between these proximal ends. The outer width of the body may be measured between opposite facing side surfaces. If the body has a tubular profile, each outer wall has a predetermined local thickness or width.

The shape of the body may be optimised for reducing stress concentrations to a minimum. For example, the body may have a curved profile, e.g. a circular or elliptical cross-sectional profile, thereby providing at least a smooth outer profile. This reduces the risk of the interlocking device breaking during movement of the individual panel sections. This also reduces the risk of cracks occurring in the core element, or even pieces of the core material breaking off.

The body of the interlocking profile may alternatively have a rectangular, a triangular or a polygonal cross-sectional outer profile. Optionally, the body may comprise one or more cut-outs for saving material.

According to one embodiment, said at least one interlocking device further comprises means for preventing the at least one interlocking device from moving out of engagement with at least one of the first and second panel sections.

The interlocking device may be fitted with means for preventing the first engaging element from moving out of engagement with first and second panel sections once placed in the final position. This reduces the risk of the interlocking device accidently moving of engagement during movement of the individual panel sections.

For example, a number of hooks or fins may be arranged on the first engaging elements and/or the base portion and project outwards from the outer side surface and/or inner side surface. The hooks or fins may extend fully or partly along the height of the first engaging elements and/or of the base portion and may function as barbs.

For example, one or more series of ridges or grooves may be arranged on the first engaging elements and/or the base portion and project outwards from the outer side surface and/or inner side surface. The ridges or grooves may extend continuously or partly along the circumference of the first engaging elements and/or the base portion. For example, the ridges or grooves may be shaped as rings or spirals extending along the inner and/or outer side surface.

For example, the first engaging elements may have a tapered outer side surface and/or a tapered inner side surface, wherein the width may taper from the first proximal end to the second end. This pushes the first engaging elements inwards or outwards during installation, thereby increasing the strength of the engagement.

The outer side surface and/or inner side surface of the interlocking device may alternatively be treated or machined to form a substantial rough surface and/or have a friction coefficient that reduces the risk of the interlocking device moving out of engagement.

The interlocking device may be manufactured separately from the panel sections, e.g. using a different manufacturing technique. For example, the interlocking device may be manufactured by three-dimensional (3D) printing, CNC machining, injection moulding or punched out using a punch press. Other manufacturing techniques may be used to manufacture the interlocking device.

According to one embodiment, said at least one interlocking device is made of a material different from the core material, e.g. a plastic material.

The interlocking device may be made of any suitable material, such as wood or a plastic material or composite. For example, the plastic material may be thermoplastic, e.g. polymer (for example acrylonitrile butadiene styrene), or engineering plastic, e.g. polyoxymethylene, however other types of plastic materials may be used. Preferably, the interlocking device may be made of a material or composite that differs from the core material of the panel sections. This allows the interlocking device to be forced into engagement with the panel sections. This may in some instance prevent the interlocking devices from getting hit by lightning.

In an alternate configuration, the interlocking device may be function as an electrical connector between a lightning down conductor located at the interior of the wind turbine blade and a lightning receptor located at the exterior of the wind turbine blade. For example, one or more electrical connectors may be integrated into the interlocking device or extending through the interlocking device.

One object of the invention is also achieved by a kit for manufacturing a wind turbine blade component, comprising:
a first panel section comprising at least one first core element of a core material, the first panel section having a first side surface, an opposite second side surface, a first edge surface and an opposite second edge surface,
at least a second panel section comprising at least one second core element of the core material, the second panel section further having a first side surface, an opposite second side surface, a first edge surface and an opposite second edge surface, and
at least one interlocking device configured to interlock the first and second panel sections relative to each other, characterised in that the at least interlocking device is configured as described above.

This provides a kit comprising a number of improved interlocking devices for locking the individual panel sections relative to each other that does not require additional machining of the panel sections. The interlocking device described above can thus be used together with existing panel sections as well as new panel sections. This allows for a reliable and stable joint between the individual panel sections.

Each panel section has a side surface for contacting adjoining layers of a fibre material. For example, each panel section has a first side surface for contacting a first number of layers of the fibre material and a second side surface for contacting a second number of layers of the fibre material. Each panel section further has a peripheral edge extending along the profile of the panel section. For example, each panel section comprises a first edge surface facing in a longitudinal direction and further a second edge surface facing in a transverse direction. Each panel section has a local thickness measured between the respective side surfaces. The panel section may have constant local thicknesses measured between the respective edge surfaces, thereby forming a uniform panel section.

The kit may comprise one, two, three or more sets of uniform panel sections where each set has a different local thickness. This allows the total thickness and thus the structural properties of the sandwich structure to be adapted to the geometrical properties of the wind turbine blades.

The kit may further comprise one, two, three or more sets of adaptive panel sections each having different local thicknesses. Each adaptive panel section may comprise at least one tapered portion at which the local thickness tapers from one end to another end. For example, the tapered portion may extend from one first or second edge surface to the opposite first or second edge surface, thus forming continuously tapering panel section. For example, the tapered portion may be arranged adjacent to one or two uniform portions has a constant local thickness. For example, a first tapered portion may be arranged adjacent to at least a second tapered portion, wherein the tapered profile of these first and second portions differs. This allows for a smooth continnous transition between uniform panel sections of different local thicknesses.

A first and a second panel section may be arranged relative to each other so that their opposite facing first and/or second edge surfaces abutted each other or form a small gap between the first and second panel sections. This allows the individual panel sections to adapt to the contour of the wind turbine blade, e.g. the first layers of fibre material, during the lay-up.

The gap may have a maximum width measured between the respective edge surfaces of 10 millimetres, preferably a maximum width of 5 millimetres. This allows for minor corrections between the individual panel sections unlike conventional dovetail or butt joints. This also reduces the risk of resin accumulating between panel sections, thereby providing a more uniform distribution of the resin. Conventional dovetail or butt joints is used to force adjacent panel sections together using compression wherein the dovetail or butt joint is placed in a tight engagement with the adjacent panel sections.

Once aligned, the first and second panel sections are locked relative to each other via a number of interlocking devices brought into engagement with the first and second panel sections. For example, a single interlocking device may be used to connect the first and second panel sections. Alternatively, a plurality of interlocking devices may be used to connect the first and second panel sections. This allows the individual panel sections to be locked relative to each other during the lay-up.

The interlocking device may have a body with a uniform height, thereby forming a substantially planar first end and/or second end. This allows the interlocking device to lock panel sections, or portions thereof, with substantially uniform local thicknesses. Alternatively, the body may have at least one tapered portion arranged at the first end and/or the second end. The height of the body within this tapered portion may taper from one end to another end. This allows the interlocking device to lock panel sections with adaptive local thicknesses, as described above.

The kit may additionally or alternatively comprise one, two, three or more sets of interlocking devices, wherein each set of interlocking devices has different total heights. For example, one set of interlocking devices may have a first total height; another set of interlocking devices may have a second total height; and so on. Each set may correspond to a particular set of adaptive panel sections or uniform panel sections. This reduces the risk of mixing the interlocking devices for different panel thicknesses which otherwise could cause steps or wrinkles in the fibre material.

According to one embodiment, at least one of the first and second panel sections has at least one recess arranged in the second side surface, wherein said at least one recess has a predetermined depth and is configured to at least partly receive the at least one interlocking device.

The interlocking device may be freely positioned along the peripheral edges of the first and second panel sections, as described earlier.

Alternatively, the first panel section may comprise a number of first recess portions and the second panel section may comprise a number of second recess portions, each of the first and second recess portions form a combined recess for receiving the interlocking device. The first and recess portions may be arranged in one or more core elements of the first and second panels sections.

The combined recess may have substantially the same profile as the interlocking device or a part thereof, e.g. the base portion. The depth of the combined recess and thus the two recess portions may be smaller than the local thickness of the first and second panel sections. For example, the depth may be equal to the height of the first engaging elements or the base portion. This allows the interlocking device to be forced into engagement with the respective panel section. Each recess portion may be arranged in the second side surface of the respective panel section adjacent to the first or second edge surface. The combined recess may thus be used to place the interlocking device in the temporary position before moving it into the final position. This allows the interlocking devices to be placed in predetermined locations on each of the individual panel sections.

The panel sections may be made of any suitable core material, such as balsa, foam, reinforced foam, honey comb or other suitable core materials. This allows the kit to have uniform structural properties over the total surface area.

Each panel section may comprise a single continuous core element or a plurality of core elements arranged relative to each other. The individual core elements may be shaped as elongated rods or rectangular blocks. The individual core elements may be attached to a continuous flexible layer or sheet configured to hold the core elements in place relative to each other. The flexible layer or sheet may be made of a fibre material, a thermoplastic material, a veneer material or another suitable material. For example, the fibre material may comprise fibres made of glass, carbon, aramid, basalt or another suitable material. For example, the thermoplastic may be polyester or another suitable thermoplastic material. For example, the veneer material may be wood, e.g. balsa.

One object of the invention is further achieved by a method of manufacturing a wind turbine blade component, the method comprises the steps of:

laying up a first number of layers of a fibre material in a mould, the first number of layers defining an outer side surface of the wind turbine blade, arranging a kit of panel sections on top of said first number of layers, wherein said kit comprises a plurality of panel sections, locking a first of said panel sections relative to a second of said panel sections by moving at least one interlocking device, as described above, into engagement with the first and second panel sections, further laying up a second number of layers of a fibre material on top of said panel sections, the second number of layers defining an inner side surface of the wind turbine blade, infusing said fibre material and said panel sections with a first resin, substantially curing said first resin to form a sandwich structure of the wind turbine blade component.

This provides a reliable and stable method of connecting the individual panel sections during the lay-up process, thereby eliminating the need for conventional staples or splines. Once aligned, the panel sections are interlocked via the interlocking devices described above. The first engaging elements of the interlocking devices are forced into engagement with the first and second panel section by applying force to the interlocking device. This reduces the total lay-up time and allows for an accurate placement of the main laminate.

The wind turbine blade may comprise two shell parts each manufactured by laying up a first number of layers of a fibre material in a blade mould, optionally after a gel coating have been applied to the moulding surface. The above described kit of panel sections is then laid up and secured to the first number of layers or to the blade mould. Afterwards, a second number of layers of the fibre material is laid up over the panel sections and further along exposed portions of the first number of layers. The second number of layers is optionally secured to the panel sections and/or to the first number of layers or to the blade mould. Resin is then introduced into the fibre material and the core material, and finally cured to form two halves of a blade shell with a desired aerodynamic profile. The two blade shell parts are finally adhered together and then worked into their finished shape.

According to one embodiment, said the at least one interlocking device is forced into a final position in which the first end of the at least one interlocking device is substantially flushed or retracted relative to a second side surface of the first and second panel sections, wherein said force is applied by hand or via an external tool.

The second end of the interlocking device may be freely positioned relative to a second side surface of the respective panel section, or be positioned in a combined recess formed in the second side surfaces of the first and second panel sections. Force may then be applied to the first end to drive the interlocking device into the first and second panel sections. Thereby, bringing the first engaging elements of the interlocking device into engage with at least the respective core elements of the first and second panel sections. This allows the interlocking devices to be installed without the need for cavities in the edge surfaces of the panel sections.

Force is applied until the first end is substantially flushed or retracted relative to a second side surface of the first and second panel sections. The interlocking device is then positioned in a final position relative to the respective panel sections. The second end may in the final position be concealed between the first and second side surfaces of the respective panel sections. This allows the interlocking device to be concealed within the adjacent core elements of the panel sections.

The force may for example be applied directly by hand if the core elements are made of a relative soft core material, e.g. open-cell foam. The force may for example be applied directly by tapping the first end of the interlocking device with an external tool, such as a hammer, if the core elements are made of a relative hard core material, e.g. closed-cell or solid foam or balsa wood. This provides a simple and easy way of installing the interlocking devices.

According to one embodiment, said the at least one interlocking device is forced into a final position in which the first end of the at least one interlocking device is substantially flushed or retracted relative to a second side surface of the first and second panel sections, wherein said force is applied via an installation tool.

The installation of the interlocking devices may also be performed using a suitable installation tool. The interlocking device may be positioned partly or fully within the installation tool with the second end facing away from the installation tool. The installation tool may then be positioned relative to the second side surface and the first and second panel sections. Force is afterwards applied to the interlocking device via the installation tool to drive the interlocking device into the core elements at a correct angle. This reduces the risk of dents forming in the second side surface during the installation. This also allows for a more controlled movement of the interlocking device into the core elements, thereby reducing the risk of the interlocking device being installed at an incorrect angle.

The installation tool may comprise a first part configured to provide a stable support when driving the interlocking device into the final position. The first part may comprise a support end or flange for contacting the second side surface. The first part may further form a recess for receiving the interlocking device.

The installation tool may further comprise a second part connected to the first part. The second part may be configured to drive the interlocking device into the final position. The second part may comprise an element, e.g. a piston-like element, moveable connected to the first part for contacting the first end of the interlocking device at one end. This moveable element may be partly arranged inside a chamber formed by the first part. For example, said one end may be moveable arranged inside the chamber and connected to a shaft extending out of the chamber. For example, the one end may have a planar end surface for contacting the first end of the interlocking device. For example, the one end may have an end surface with a number of recesses shaped to match the profile of the second engaging elements for contacting the interlocking device. This allows the force to be distributed over a greater contact area.

The shaft may be further connected to another end of this moveable element, wherein said another end projects freely from the first part. This other end of the moveable element may be coupled to an internal drive unit configured to control the movement of this element and thus apply force to the interlocking device. For example, the internal drive unit may be a pneumatic drive unit, a hydraulic drive unit, an electronic drive unit or another suitable drive unit. The element may be moved to an extended position which, in turn, may move the interlocking device into its final position. This provides an integrated unit for installing the interlocking device.

Alternatively, the moveable element may act as a drivable unit where the force may be applied externally to the other end of the moveable element. The element may for example be moved by hand or by tapping the other end with the external tool, e.g. the hammer. The element may also be moved by applying force via an external drive unit, such as a pneumatic drive unit, a hydraulic drive unit, an electronic drive unit or another suitable drive unit. This provides a compact unit for installing the interlocking device.

A spring element may be arranged inside the chamber and connected to the moveable element and the first part, e.g. a shoulder projecting into the chamber or an end piece defining the bottom of said chamber. This allows the moveable element to be biased back towards its retracted position once the force is removed.

The installation tool may optionally comprise a handle unit enabling the worker to hold and operate the installation tool. The installation tool may optionally comprise a chamber or magazine for holding multiple interlocking devices, wherein a new interlocking device may be moved into position relative to the moveable element after completing the installation of a current interlocking device.

According to one embodiment, the at least one interlocking device is moved into a temporary position before being moved into the final position.

The interlocking device may be moved into the temporary position relative to the first and second panel sections before being moved into the final position. Thereby, allowing the panel sections to be re-aligned, if needed. In this temporary position, the secand end, e.g. the first engaging elements, of the interlocking device may project fully or partly into the core elements of the respective panel sections while the first end, e.g. the body or the second engaging element, may be project outwards from the second side surface. The interlocking device may thus be removed and re-positioned along the peripheral edge of the respective panel sections.

If no re-alignment is needed, then the interlocking device may simply be moved from this temporary position and further into the final position.

According to one embodiment, at least one first engaging element of the at least one interlocking device is moved further into engagement with said first number of layers.

When moving the interlocking device into the final position, the first engaging elements or at least one set of first engaging elements may be moved out of the first side surface and further into engagement with the adjoining first number of layers of the fibre material. The remaining sets of first engaging elements may remain concealed within the core elements of the respective panel section. This allows the interlocking device to secure the individual panel sections relative to the fibre material, thus preventing it from sliding out of position.

In this configuration, the total height of the interlocking device may be greater than the local thickness of the first and/or second panel section.

An object of the invention is even further achieved by a wind turbine blade extending from a blade root to a tip end in a longitudinal direction and further from a leading edge to a trailing edge in a chordwise direction, the wind turbine blade comprises at least one blade shell part having an outer side surface and an inner side surface, the at least one blade shell part comprises a sandwich structure having a first number of layers of a first fibre material, a kit of panel sections and a second number of layers of a first fibre material, characterised in that the kit of panel section is configured as described above.

Integrating the present kit configuration into the blade shell of a wind turbine blade provides a sandwich structure having a kit of core panels with substantially uniform structural properties. The present interlocking devices allows for a substantially uniform resin distribution over the surface area of the kit of panel sections, thereby reducing the risk of resin accumulating in the large gaps and wrinkles occurring in the cured sandwich structure.

The above mentioned wind turbine blade component may be a first and/or blade shell part, or another relevant component of the wind turbine blade, e.g. a shear web or a bulkhead.

DESCRIPTION OF DRAWINGS

The invention is explained in detail below with reference to embodiments shown in the drawings, in which.

LIST OF REFERENCES

Figure 1:
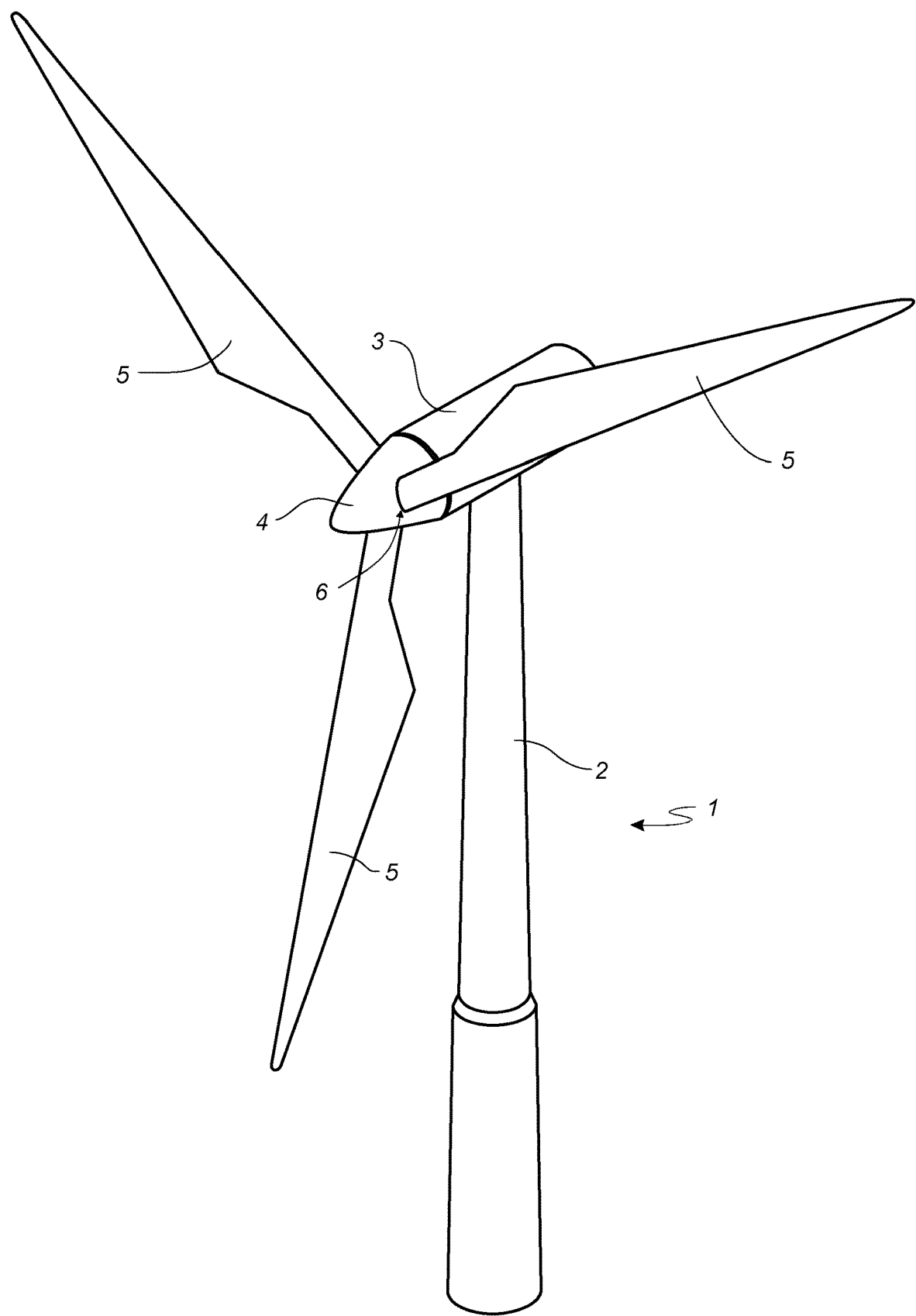
FIG. 1 shows a wind turbine.

1. Wind turbine
2. Wind turbine tower
3. Nacelle
4. Hub
5. Wind turbine blades
6. Pitch bearing
7. Blade root
8. Tip end
9. Leading edge
10. Trailing edge
11. Blade shell
12. Pressure side
13. Suction side
14. Blade root portion
15. Aerodynamic blade portion
16. Transition portion
17. Length of wind turbine blade
18. Chord length of wind turbine blade
19. Kit
20. Panel sections
20a-b. First and second panel sections
21. First number of layers
22. Interlocking devices
23. Gaps
24. Second number of layers
25. Resin flow network
26. Second side surface
27. First edge surface
28. Second edge surface
29. Combined recess
30. Body of interlocking device
31. First end
32. First proximal end
33. First engaging elements
34. Second end
35. Inner side surface
36. Outer side surface
37. Series of ridges and grooves
38. First side surface
39. Second engaging elements
40. Second proximal end
41. Flanges
42. Core elements
43. Flexible layer
44. Installation tool
45. First part
46. Second part
47. Support flanges
48. First chamber
49. Recess
50. Moveable element, piston
51. Spring element
52. External force
53. Second chamber
54. Drive unit The listed reference numbers are shown in abovementioned drawings where no all reference numbers are shown on the same figure for illustrative purposes. The same part or position seen in the drawings will be numbered with the same reference number in different figures.

DETAILED DESCRIPTION OF THE DRAWINGS

FIG. 1 shows a modern wind turbine 1 comprising a wind turbine tower 2, a nacelle 3 arranged on top of the wind turbine tower 2, and a rotor defining a rotor plane. The nacelle 3 is connected to the wind turbine tower 2, e.g. via a yaw bearing unit. The rotor comprises a hub 4 and a number of wind turbine blades 5. Here three wind turbine blades are shown, but the rotor may comprise more or fewer wind turbine blades 5.

The hub 4 is connected to a drive train, e.g. a generator, located in the wind turbine 1 via a rotation shaft.

The hub 4 comprises a mounting interface for each wind turbine blade 5. A pitch bearing unit 6 is optionally connected to this mounting interface and further to a blade root of the wind turbine blade 5.

Figure 2:
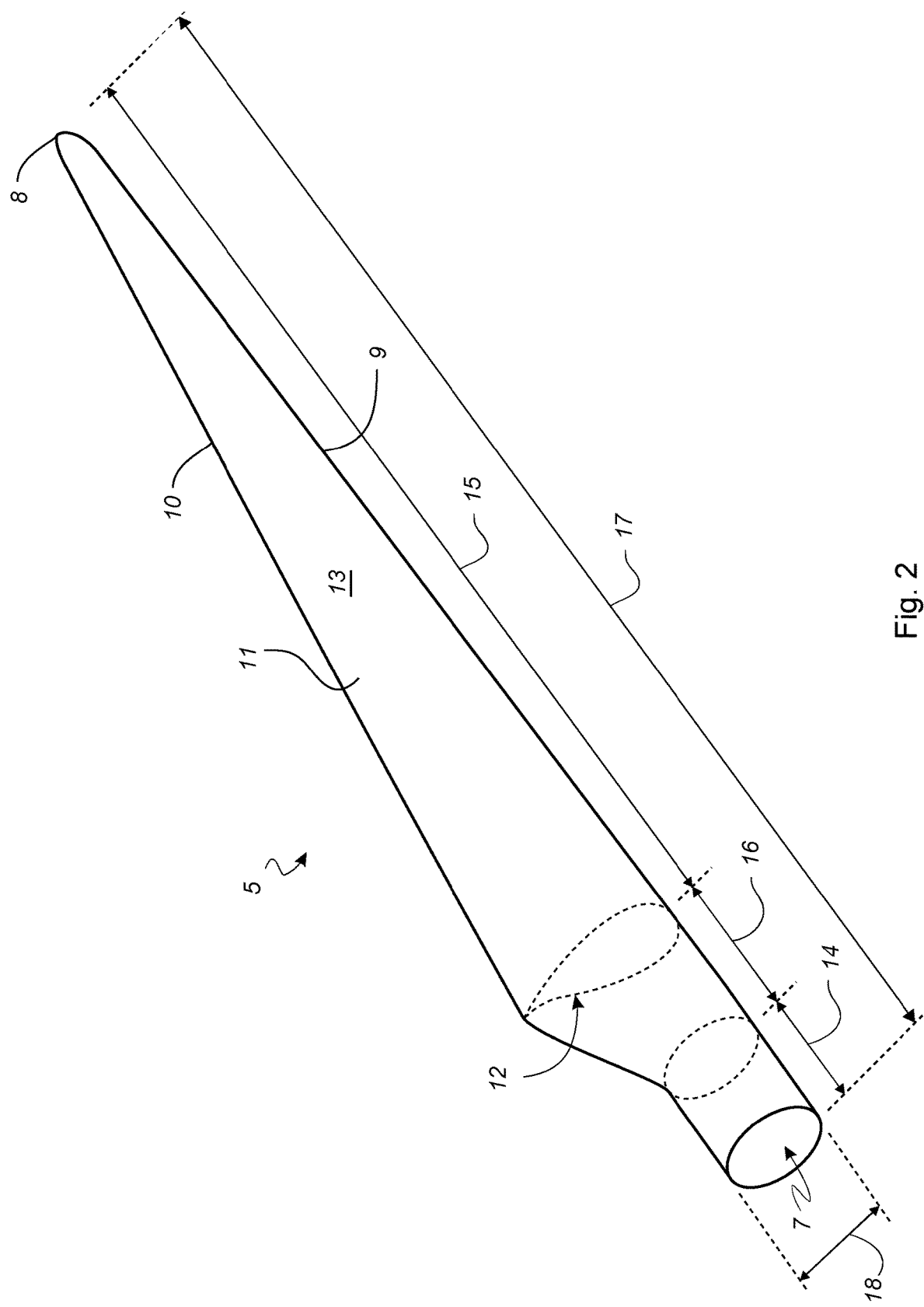
FIG. 2 shows an exemplary embodiment of the wind turbine blade.

FIG. 2 shows a schematic view of the wind turbine blade 5 which extends in a longitudinal direction from a blade root 7 to a tip end 8. The wind turbine blade 5 further extends in a chordwise direction from a leading edge 9 to a trailing edge 10. The wind turbine blade 5 comprises a blade shell 11 having two opposite facing side surfaces defining a pressure side 12 and a suction side 13 respectively. The blade shell 11 further defines a blade root portion 14, an aerodynamic blade portion 15, and a transition portion 16 between the blade root portion 14 and the aerodynamic blade portion 15.

The blade root portion 14 has a substantially circular or elliptical cross-section (indicated by dashed lines). The blade root portion 14 together with a load carrying structure, e.g. a main laminate combined with a shear web or a box beam, are configured to add structural strength to the wind turbine blade 5 and transfer the dynamic loads to the hub 4. The load carrying structure extends between the pressure side 12 and the suction side 13 and further in the longitudinal direction.

The blade aerodynamic blade portion 15 has an aerodynamically shaped cross-section (indicated by dashed lines) designed to generate lift. The cross-sectional profile of the blade shell 11 gradually transforms from the circular or elliptical profile into the aerodynamic profile in the transition portion 16.

The wind turbine blade 5 has a longitudinal length 17 of at least 35 metres, preferably at least 50 metres. The wind turbine blade 5 further has a chord length 18 as function of the length 17, wherein the maximum chord length is found between the blade aerodynamic blade portion 15 and the transition portion 16. The wind turbine blade 5 further has a blade thickness 19 as function of the chord length 18, wherein the blade thickness 19 is measured between the pressure side 12 and the suction side 13.

Figure 3:
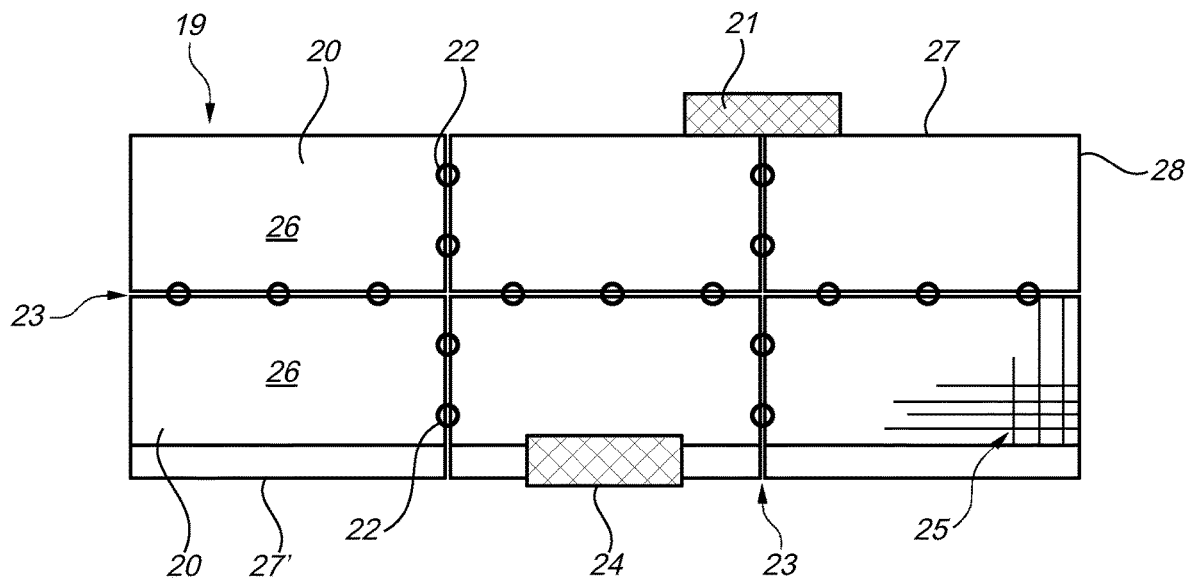
FIG. 3 shows an exemplary embodiment of a kit of panel sections of the wind turbine blade.

FIG. 3 shows an exemplary embodiment of a kit 19 of individual panel sections 20 made of a core material, e.g. foam or balsa wood. During manufacture of the wind turbine blade 5, a first number of layers 21 of a fibre material are arranged on a moulding surface of a blade mould.

The kit 19 of panel sections 20 are then arranged on top of the layers 21. A first panel section 20 is positioned adjacent to a second panel section 20 and the interlocking device 22 is afterwards brought into engagement with the adjacent panel sections, thereby interlocking the first and second panel sections 20 relative to each other.

Here, the panel sections 20 are spaced apart to form a gap 23 between opposite facing first and second edge surfaces 27, 28 of the first and second panel sections. The gap 23 has a maximum width of 10 millimetres, preferably 5 millimetres or 3 millimetres.

Figure 9:
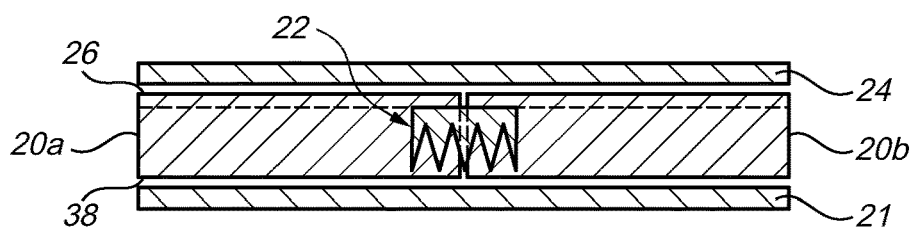
FIG. 9 shows a third embodiment of the interlocking device.

After completing the lay-up of the kit 19 of panel sections 20, a second number of layers 24 of a fibre material are arranged on top of the panel sections 20. Resin in then introducing into the layers 21, 24 of fibre material and the core material of the panel sections 20. The panel sections 20 comprise an optional resin flow network 25 in the form of an arrangement of grooves extending in the longitudinal direction and/or in the chordwise direction, as indicated in FIG. 9.

Each panel section 20 has a first side surface (shown in FIGS. 6-10) facing the layers 21 and a second side surface 26 facing the layers 24. Each panel section 20 further has a continuous peripheral edge which defines a first edge surface 27 facing in the chordwise direction and a second edge surface 28 facing in the longitudinal direction. A plurality of interlocking devices 22 are distributed along opposite facing first and second edge surfaces 27, 28 of the panel sections 20, as indicated in FIG. 3. Here, the panel sections 20 facing a main laminate (not shown) of the wind turbine blade 5 comprise a tapered edge profile having a first edge surface 27' with a reduced thickness.

Figure 4:
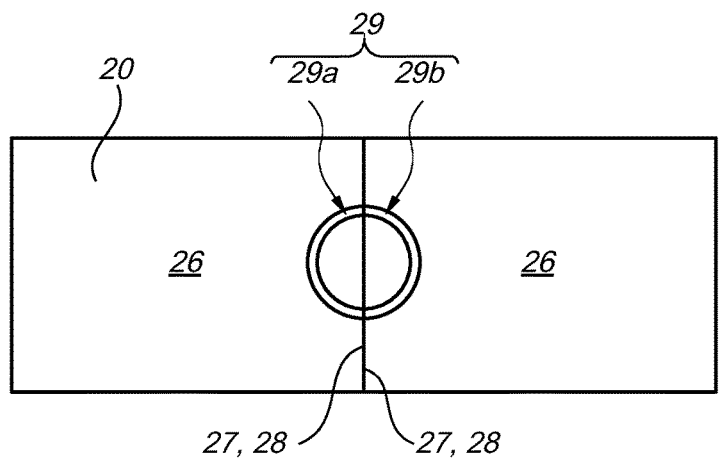
FIG. 4 shows an alternative embodiment of the kit of panel sections.

FIG. 4 shows an alternative embodiment of the kit 19 of panel sections 20 where the first and second panel sections 20 are abutting each other. The opposite facing first and second edge surfaces are thereby bring into contact with each other and thus no gap is formed between the panel sections 20.

In this configuration, a first recess portion 29a is arranged in the second side surface 26 of the first panel section 20 and a second recess portion 29b is arranged in the second surface 26 of the second panel section 20. The first and second recess portions 29a, 29b are arranged at the first or second edge surface 27, 28 and facing each other, as indicated in FIG. 4. The first and second recess portions 29a, 29b form a combined recess 29 for partly receiving the interlocking device 22. This allows the interlocking device 22 to be held in position before being moved into engagement with the first and second panel sections 20.

Figure 5:
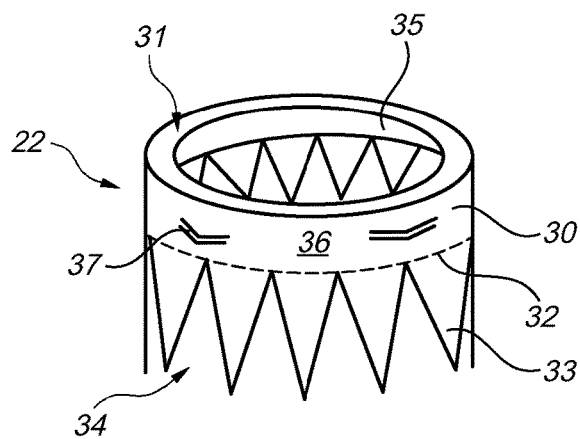
FIG. 5 shows a first embodiment of the interlocking device.

FIG. 5 shows a first embodiment of the interlocking device 22 comprising a base portion extending from a first end 31 to a first proximal end 32. The base portion defines a body 30 of the interlocking device 22. The body 30 is configured to provide support for a number of first engaging elements 33 extending from the first proximal end 32 to a second end 34.

Here, the first engaging elements 33 are shaped as teeth with a triangular profile. The teeth may alternately have a semi- or quarter-circular profile. The first engaging elements 33 or teeth have a local height measured between the first proximal end 32 and the second end 34. The first engaging elements 33 are distributed along the first proximal end 32 of the body 30.

Here, the body 30 has a tubular profile with a circular cross-sectional profile defining an inner side surface 35 and an outer side surface 36. The body 30 has a local width measured between the inner and outer side surfaces 35, 36 and a local height measured between the first proximal end 32 and the first end 31.

Figure 6:
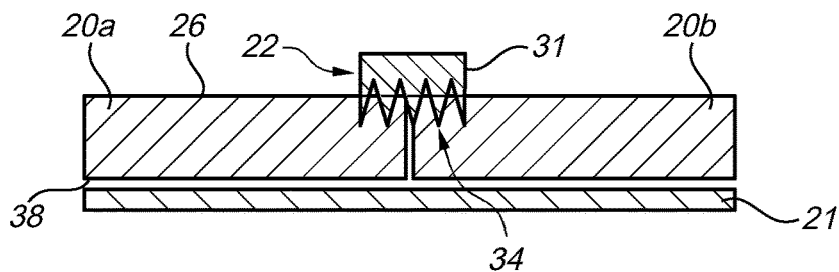
FIG. 6 shows the interlocking device placed in a temporary position.

FIG. 6 shows the interlocking device 22 placed in a temporary position during the lay-up, wherein the first engaging elements 33 are brought into partly engagement with the panel sections 20. In this temporary position, the second end 34 is arranged between the first side surface 38 and the second side surface 26 of the first panel section 20a and the second panel section 20b respectively. The first end 31 project outwards from the second side surface 26, thereby allowing the interlocking device 22 to be removed and re-positioned relative to the first and second panel sections 20a, 20b.

Figure 7:
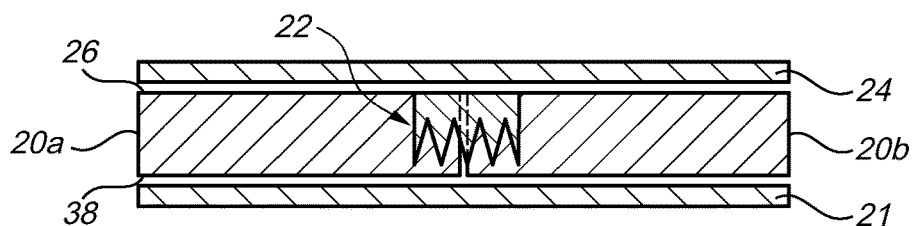
FIG. 7 shows the interlocking device placed in a final position.

FIG. 7 shows the interlocking device 22 placed in a final position, wherein an end surface of the first end 31 is substantially flushed with the second side surface 26 of the first and second panel sections 20a, 20b. This provides a concealed joint between the adjacent panel sections 20 and thus a continuous side surface. The layers 24 are then laid up on this continuous side surface to form the sandwich structure, as indicated in FIG. 3.

In this configuration, the total height of the interlocking device 22 is less than the local thickness of the first panel section 20a or the second panel section 20b. Thereby, concealing the body 30 and the second end 34 of the first engaging elements 33 within the panel sections 20a, 20b.

Figure 8:
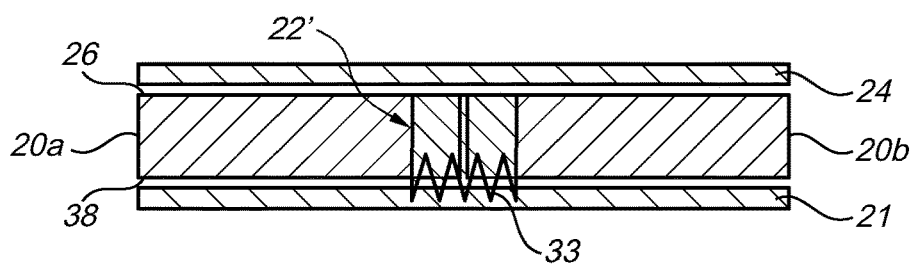
FIG. 8 shows a second embodiment of the interlocking device.

FIG. 8 shows a second embodiment of the interlocking device 22', wherein the total height is greater than the local thickness of the first panel section 20a or the second panel section 20b. The second end 34 of the first engaging elements 33 thus project beyond the first side surface 38 while the first proximal end 32 and thus the body 30 remain concealed within the panel sections 20a, 20b. Thereby, enabling the first engaging elements 33 to engage the layers 21, as indicated in FIG. 8, and thus securing the first and second panel sections 20a, 20b relative to the layers 21.

FIG. 9 shows a third embodiment of the interlocking device 22, wherein the interlocking device 22 is placed in an alternative final position. In this alternative final position, the end surface of the first end 31 is retracted relative to the second side surfaces 26.

The end surface of the first end 31 is instead substantially flushed with a bottom surface (indicated by dashed lines) of the grooves forming the optional resin flow network 25 shown in FIG. 3. Thereby, forming a continuous resin flow network along the first and second panel sections 20a, 20b.

The height of the interlocking device 22 of FIG. 9 is equal to or less than the height of the interlocking device of FIG. 7.

Figure 10:
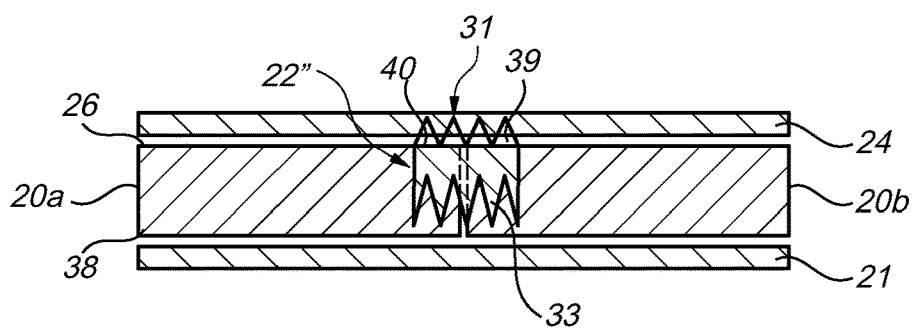
FIG. 10 shows a fourth embodiment of the interlocking device.

FIG. 10 shows a fourth embodiment of the interlocking device 22" further comprising a number of second engaging elements 39 extending from a second proximal end 40 to the first end 31.

Here, the second engaging elements 39 are shaped as teeth with a triangular profile. The teeth may alternately have a semi- or quarter-circular profile. The second engaging elements 39 or teeth have a local height measured between the second proximal end 40 and the first end 31. The second engaging elements 39 are distributed along the second proximal end 40 of the body 30, alternatively, along parts thereof.

The second engaging elements 39 projects from the second side surface 26 of the first and second panel sections 20a, 20b. Thereby, enabling the second engaging elements 39 to engage the layers 24, as indicated in FIG. 10, and thus securing the layers 24 relative to the first and second panel sections 20a, 20b.

Figure 11:
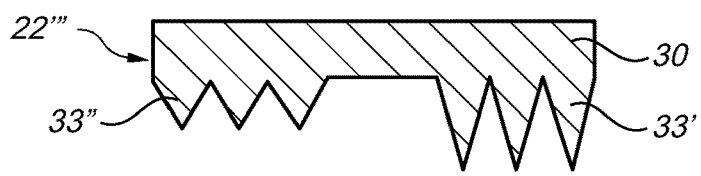
FIG. 11 shows a fifth embodiment of the interlocking device.

FIG. 11 shows a fifth embodiment of the interlocking device 22''' comprising a first set of first engaging elements 33' and a second set of first engaging elements 33". The first set of first engaging elements 33' has a first local height and the second set of first engaging elements 33" has a second local height. Here, the first engaging elements 33' have a greater local height than the local height of the first engaging elements 33".

The first and second sets of first engaging elements 33', 33" are arranged in an alternating order or in groups along the first proximal end 32.

The first engaging elements 33' may thus project beyond the first side surface 38 while the first engaging elements 33" may remain concealed within the first or second panel section 20a, 20b.

Figure 12:
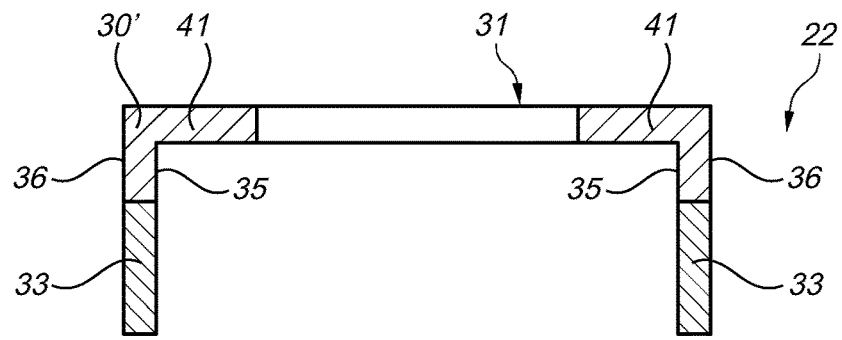
FIG. 12 shows a cross-section of the interlocking device with a tubular body.

FIG. 12 shows a cross-section of the interlocking device 22 with a body 30' having an alternative tubular profile. Here, the body 30' further comprises a ring-shaped flange 41 projecting inwards from the inner side surface 35. The flange 41 is arranged at the first end 31. This increases the total end surface area of the first end 31, thereby allows the applied force to be distributed over a greater surface area.

Figure 13:
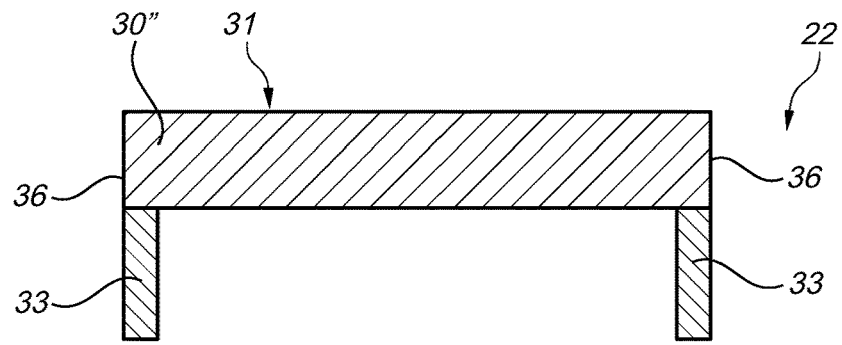
FIG. 13 shows a cross-section of the interlocking device with a solid body.

FIG. 13 shows a cross-section of the interlocking device 22 with a body 30" having solid profile. Here, the body 30" forms no inner cavities and thus has no inner surfaces 35 compared with the tubular body 30, 30' of FIGS. 5 and 12.

Figure 16:
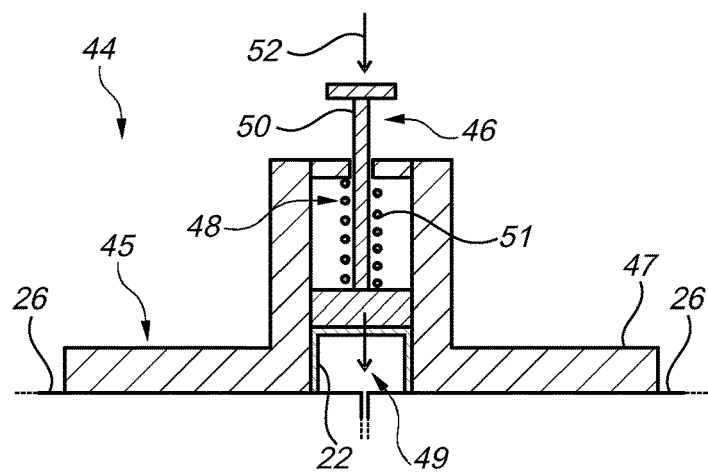
FIG. 16 shows a first embodiment of an installation tool in a retracted position.
Figure 17:
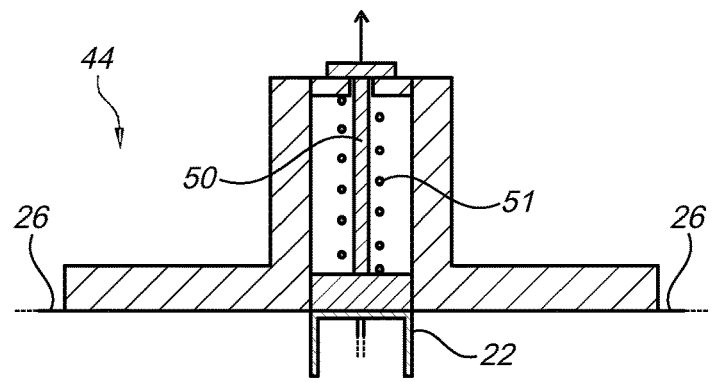
FIG. 17 shows the installation tool in an extended position.
Figure 18:
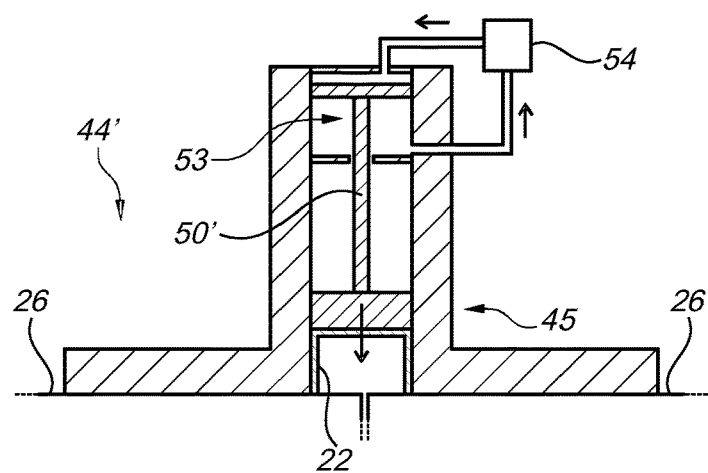
FIG. 18 shows a second embodiment of the installation tool.

The interlocking device 22 may be installed by applying force directly to the first end 31, e.g. the flanges 41 or the body 30". Alternatively, the interlocking device 22 may be installed using an installation tool, as indicated in FIGS. 16-18.

FIG. 14a-d shows four exemplary profiles of the interlocking device 22. The interlocking device 22 preferably has a circular profile, as indicated in FIG. 5, or an elliptical profile, as indicated in FIG. 14d. The interlocking device 22 may alternatively have a triangular profile, as indicated in FIG. 14a, or a rectangular profile, as indicated in FIG. 14b, or a polygonal profile, as indicated in FIG. 14c.

Figure 14:
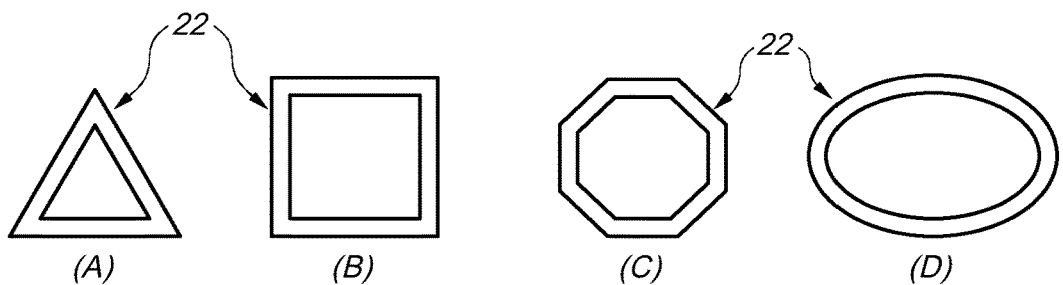
FIG. 14a-d shows exemplary profiles of the interlocking device.
Figure 15:
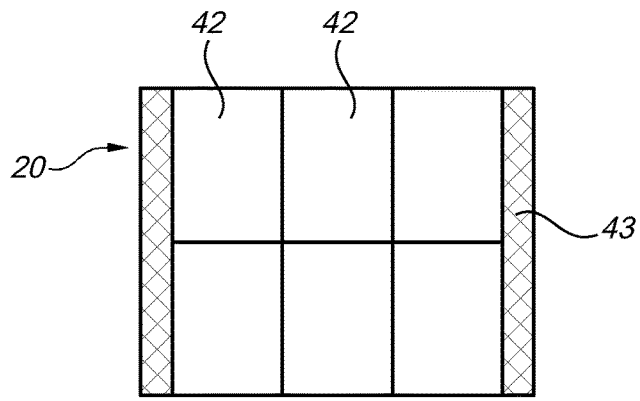
FIG. 15 shows an exemplary embodiment of the panel section with a plurality of core elements arranged on a flexible layer.

FIG. 14 shows an exemplary embodiment of the panel section 20 comprising a plurality of core elements 42 arranged on a flexible layer 43 defining the first side surface 38. The individual core elements 42 are arranged relative to each other to form the panel section 20. Here, the core elements 42 are shaped as core blocks, however, the core elements may also be shaped as elongated rod-like elements.

The core elements 42 are attached to the flexible layer 43, e.g. using an adhesive. The flexible layer 43 is configured to hold the core elements 42 in place and allows the core elements to adapt to the contours of the wind turbine blade 5 during lay-up.

FIG. 16 shows a first embodiment of the installation tool 44 in a retracted position and FIG. 17 shows the installation tool 44 in an extended position. Here, the installation tool 44 is configured as a compact device.

The installation tool 44 comprises a first part 45 having a support flange 47 configured to provide a stable support during installation of the interlocking device 22. The support flange 47 has a contact surface for contacting the second side surface 26 of the first and second panel sections 20a, 20b. The first part 45 forms a first chamber 48 in connected with an opening formed in the contact surface. In the retracted position, the first chamber 48 further defines a recess 49 for receiving and holding the interlocking device 22.

The installation tool 44 further comprises a second part 46 configured to move the interlocking device 22 from an initial position, as indicated in FIG. 16, and into the temporary position or further into the final position, as indicated in FIG. 17. The second part 46 comprises a moveable element 50 in the form of a piston. One end of the element 50 is moveably arranged inside the chamber 48 and connected to a shaft. The shaft extends out of the chamber 48 via an opening in an end piece of the first part 45. The shaft is further connected to an opposite end of the element 50 projecting from the first part 45.

A spring element 51 is connected to the first part 45 and to the element 50 for biasing the movement of the element 50.

The interlocking device 44 is initially loaded into the recess 49 so that the first end 31 is brought into contact with the end of the element 50. The support flange 47 is afterwards placed on the second side surface 26 of the first and second panel sections 20a, 20b.

An external force 52 is then applied to the free projecting end of the element 50, e.g. by hand or by tapping the end with a hammer. This causes the element 50 to move towards the extended position, thereby forcing the interlocking device 22 into engagement with the first and second panel sections 20*a*, 20*b*. Force is applied until the element 50 is in the extended position and thus the interlocking device 22 is forced into the final position.

The force is afterwards removed and the element 50 is biased (indicated by arrow in FIG. 17) towards the retracted position via the spring element 51. The process is then repeated for the next interlocking device 22.

FIG. 18 shows a second embodiment of the installation tool 44', wherein the installation tool 44' is configured as an integrated device.

A second chamber 53 is further arranged inside the first part 45 adjacent to the first chamber 48. The second chamber 53 is closed off by a seal element or an internal wall, thereby forming an enclosed chamber. The opposite end of the element 50' is in this configuration arranged inside the second chamber 53.

An inlet is connected to the second chamber 53 for feeding a fluid into the chamber 53.

An outlet is further connected to the second chamber 53 for leading the fluid out of the chamber 53. The inlet and outlet are coupled to a pumping system 54 configured to pump fluid into or out of the second chamber 53. The pumping system 54 is configured to control the fluid flow for moving the element 50'.

In this configuration, force is applied to the interlocking device 22 by pumping fluid into the second chamber 53, as indicated in FIG. 18. Once the interlocking device 22 is forced into the final position, the pumping is stopped. The element 50' is then retracted by reversing the direction of flow in the pumping system 54. A new interlocking device 22 may then be loaded into the installation tool 44'.

The abovementioned embodiments may be combined in any combinations without deviating from the present invention.

The invention claimed is:

1. An interlocking device (22) for locking panel sections (20) of a core material of a wind turbine blade (5), the interlocking device (22) has a first end (31), an opposite second end (34) and at least one outer side surface (35, 36) arranged between the first and second ends (31, 34), the interlocking device (22) comprises a base portion having a body (30) with a predetermined outer height and outer width, the body (30) is configured to provide support for at least a number of first engaging elements (33) projecting from a first proximal end (32) of the body (30) to the second end (34), the first engaging elements (33) being configured to be brought into engagement with a first panel section (20*a*) and a second panel section (20*b*) by applying a force to said first end (31), wherein the interlocking device (22) comprises at least one engaging element (33, 33' 39) configured to extend beyond one side surface (26, 38) of said panel sections (20), when placed in a final position of engagement, wherein said at least one engaging element (33, 33' 39) is configured to engage at least one layer (21, 24) of a fibre material arranged on said one side surface (26, 38) of the panel sections (20), wherein the interlocking device (22) is configured for locking the panel sections (20) of the core material of the wind turbine blade (5), and wherein the interlocking device (22) is made of a material different from the core material of the wind turbine blade (5).

2. The interlocking device according to claim 1, wherein said interlocking device (22) comprises a first set of first engaging elements (33') having a first local height and at least a second set of first engaging elements (33") having a second local height, wherein said first local height is equal to or greater than the second local height.

3. The interlocking device according to claim 1, wherein the interlocking device (22) further comprises a number of second engaging elements (39) projecting from a second proximal end (40) of the body (30) to the first end (31).

4. The interlocking device according to claim 1, wherein at least one of said first engaging elements (33) and said second engaging elements (39) are teeth each with a predetermined profile.

5. The interlocking device according to claim 1, wherein said body (30) is a solid or tubular body with at least an outer side surface (36) arranged between said first proximal end (32) and said first end (31) or second proximal end (40).

6. The interlocking device according to claim 1, wherein said at least one interlocking device (22) further comprises means (37) for preventing the at least one interlocking device (22) from moving out of engagement with at least one of the first and second panel sections (20*a*, 20*b*).

7. A kit (19) for manufacturing a wind turbine blade (5) component, comprising:

a first panel section (20*a*) comprising at least one first core element (42) of a core material, the first panel section (20*a*) having a first side surface (38), an opposite second side surface (26), a first edge surface (27) and an opposite second edge surface (28), at least a second panel section (20*b*) comprising at least one second core element (42) of the core material, the second panel section (20*b*) further having a first side surface (38), an opposite second side surface (26), a first edge surface (27) and an opposite second edge surface (28), and at least one interlocking device (22) configured to interlock the first and second panel sections (20*a*, 20*b*) relative to each other, wherein the at least interlocking device (22) is configured according to claim 1.

8. The kit according to claim 7, wherein at least one of the first and second panel sections (20*a*, 20*b*) has at least one recess (29) arranged in the second side surface (26), wherein said at least one recess (29) has a predetermined depth and is configured to at least partly receive the at least one interlocking device (22).

9. A method of manufacturing a wind turbine blade (5) component, the method comprises the steps of:

laying up a first number of layers (21) of a fibre material in a mould, the first number of layers (21) defining an outer side surface of the wind turbine blade (5), arranging a kit (19) of panel sections (20) on top of said first number of layers (21), wherein said kit (19) comprises a plurality of panel sections (20), locking a first of said panel sections (20*a*) relative to a second of said panel sections (20*b*) by moving at least one interlocking device (22) according to claim 1 into engagement with the first and second panel sections (20*a*, 20*b*), further laying up a second number of layers (24) of a fibre material on top of said panel sections (20), the second number of layers (24) defining an inner side surface of the wind turbine blade (5), infusing said fibre material and said panel sections (20) with a first resin, and substantially curing said first resin to form a sandwich structure of the wind turbine blade (5) component.

10. The method according to claim 9, wherein said the at least one interlocking device (22) is forced into a final position in which the first end (31) of the at least one interlocking device (22) is substantially flushed or retracted relative to a second side surface (26) of the first and second panel sections (20a, 20b), wherein said force is applied by hand or via an external tool.

11. The method according to claim 9, wherein said the at least one interlocking device (22) is forced into a final position in which the first end (31) of the at least one interlocking device (22) is substantially flushed or retracted relative to a second side surface (26) of the first and second panel sections (20a, 20b), wherein said force is applied via an installation tool (44).

12. The method according to claim 10, wherein the at least one interlocking device (22) is moved into a temporary position before being moved into the final position.

13. The method according to claim 9, wherein at least one first engaging element (33) of the at least one interlocking device (22) is moved further into engagement with said first number of layers (21).

14. A wind turbine blade (5) extending from a blade root (7) to a tip end (8) in a longitudinal direction and further from a leading edge (9) to a trailing edge (10) in a chordwise direction, the wind turbine blade (5) comprises at least one blade shell (11) part having an outer side surface and an inner side surface, the at least one blade shell (11) part comprises a sandwich structure having a first number of layers (21) of a first fibre material, a kit (19) of panel sections (20) and a second number of layers (24) of a first fibre material, wherein the kit (19) of panel sections (20) is configured according to claim 7.

15. The interlocking device according to claim 1, wherein said interlocking device (22) comprises a plastic material.

* * * * *